No. 870,319. PATENTED NOV. 5, 1907.
J. SCHIMANOSKI.
COMBINED PLOW AND CULTIVATOR.
APPLICATION FILED JAN. 18, 1907.
2 SHEETS—SHEET 1.
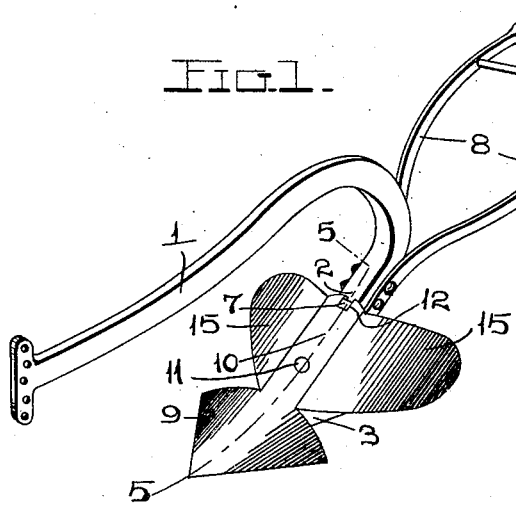
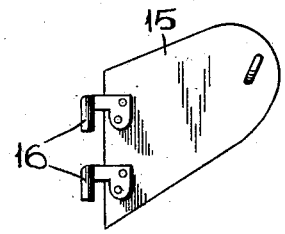
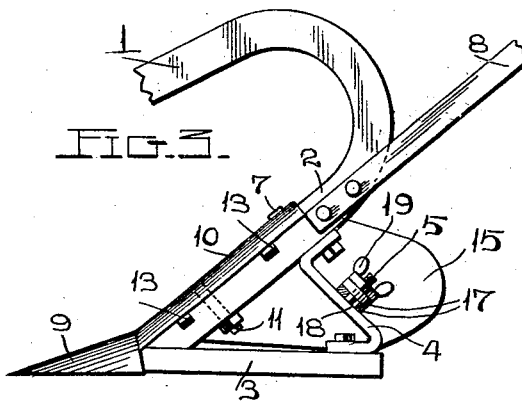
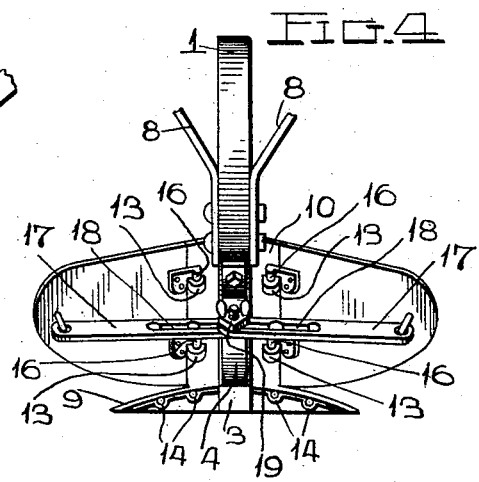
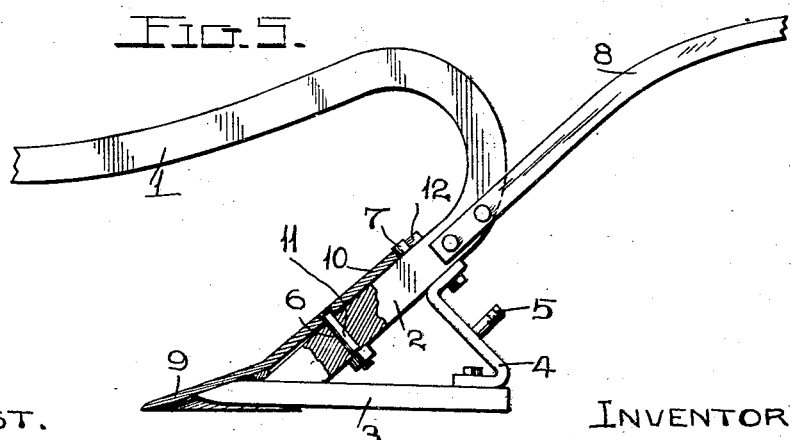
ATTEST.
H. J. Fletcher.
M. P. Smith.
INVENTOR.
JOSEPH SCHIMANOSKI.
BY Higdon & Longan
ATTY'S.

No. 870,319. PATENTED NOV. 5, 1907.
J. SCHIMANOSKI.
COMBINED PLOW AND CULTIVATOR.
APPLICATION FILED JAN. 18, 1907.
2 SHEETS—SHEET 2.
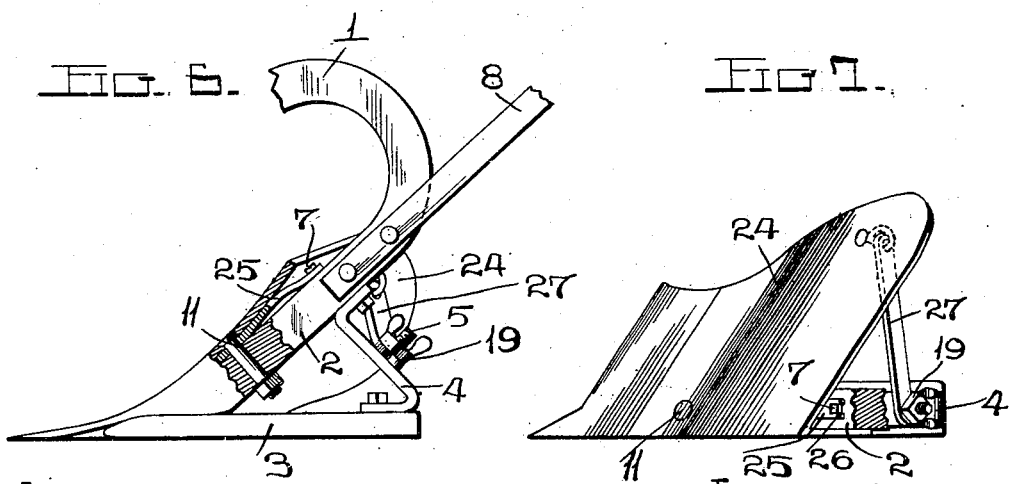
ATTEST.
INVENTOR.
JOSEPH SCHIMANOSKI.
BY Higdon Lougan
ATTY'S

UNITED STATES PATENT OFFICE.

JOSEPH SCHIMANOSKI, OF ST. LOUIS, MISSOURI.

COMBINED PLOW AND CULTIVATOR.

No. 870,319.  Specification of Letters Patent.  Patented Nov. 5, 1907.

Application filed January 18, 1907. Serial No. 352,889.

*To all whom it may concern:*

Be it known that I, JOSEPH SCHIMANOSKI, a citizen of the United States, and a resident of St. Louis, Missouri, have invented certain new and useful Improvements in a Combined Plow and Cultivator, of which the following is a specification containing a full, clear, and exact description, reference being had to the accompanying drawings, forming a part hereof.

My invention relates to a combined plow and cultivator, and the object of my invention is to provide a specially constructed plow beam and body, to which may be detachably fixed a plow share, and cultivator plow and mold boards, which latter are adjustable.

To the above purposes, my invention consists of certain novel features of construction and arrangement of parts, which will be hereinafter more fully specified, claimed and shown in the accompanying drawings, in which:—

Figure 1 is a perspective view of my invention as arranged for use as a cultivator; Fig. 2 is a rear elevation of one of the detachable mold boards; Fig. 3 is a side elevation of the invention as applied for use as a cultivator, and with one of the mold boards thereof removed; Fig. 4 is a rear elevation of the cultivator; Fig. 5 is an enlarged vertical section taken on the line 5—5 of Fig. 1; Fig. 6 is a side elevation of my invention arranged as a plow; Fig. 7 is a plan view of the plow.

Referring by numerals to the accompanying drawings:—1 designates the plow beam which is of the usual form, with its rear end bent downwardly and forwardly at an angle of approximately 45 degrees, to form the body 2, and formed on or fixed to the lower end of said body is a horizontally disposed bar 3, the forward end of which is pointed, and connecting the rear end of said bar 3 with the under side of the body 2 is a brace 4, from which projects a pin 5, the outer end of which is screw-threaded.

Passing through the body 2 at a point near its lower end is an aperture 6, and formed integral with the top of said body adjacent its upper end is a lug 7. Handles 8 of usual form are fixed in any suitable manner to the body 2 near the point where the same joins with the plow share 1.

9 designates a plow or shovel in the form of a triangular plate, the forward edges of which are sharpened, and said plate being provided with an integral arm 10 which lies directly upon the body 2, and passing through said arm 10 and through the aperture 6 is a bolt 11.

Formed in the upper end of the arm 10 is a notch 12, which receives the lug 7 when the arm 10 and shovel 9 are fixed to the body 2.

The plow or shovel 9 is attached to the body 2, and combines with other parts hereinafter described to form the cultivator and the complete plow.

The arm 10 is slightly wider than the body 2 and formed integral with the under side of said arm adjacent its edges are the perforated lugs 13, which are arranged in pairs on each side of said arm. Cultivator mold boards 15 are provided on their rear sides with hooks 16, which are detachably arranged in the pairs of perforated lugs 13, and connected in any suitable manner to the rear sides of said wings adjacent their outer ends are links 17, the inner ends of which are provided with the slots 18 and said slotted inner ends engaging over the pin 5 and being adjustably held thereon by means of a lock nut 19. By loosening this lock nut and shifting the positions of the links 17, the mold boards 15 can be moved inwardly or outwardly as desired, to throw the soil upturned by the plow or shovel 9 either in a wide or narrow furrow.

When my invention is to be used as an ordinary plow, the plow or shovel 9 and arm 10 are removed from the body 2 by removing the bolt 11, after which a plowshare 24, of ordinary form, is positioned over the body 2, and rigidly fixed thereto, by means of the bolt 11 which passes through a suitably located aperture in said plowshare and through the aperture 6.

Fixed to the under side of the plowshare is a plate 25, which is provided at its upper end with a notch 26 which engages the lug 7, and pivotally secured to the under side of the rear portion of the plowshare is a brace 27, which is positioned on the screw threaded pin 5, and locked thereon by means of the nut 19. Thus the plowshare is very rigidly held in position on the plow beam, with the point of said share extending in front of the pointed forward end of the bar 3.

An implement of my improved construction can be very easily and quickly converted for use to perform the work incident to plowing and cultivating, and said implement comprises a minimum number of parts, and is very strong and durable.

I claim:

1. An implement of the class described, comprising a plow beam, a horizontally disposed bar fixed to the lower end of the beam, a brace arranged between the beam and the rear end of the bar, a cultivator shovel detachably fixed on the forward ends of the beam and bar, an integral arm projecting upwardly from the center of the shovel, cultivator mold boards hinged to the sides of the arm, and braces connected to the rear sides of the mold boards and being adjustably attached to the brace between the plow beam and horizontally disposed bar.

2. An implement of the class described, comprising a plow beam, a lug formed thereon, a horizontally disposed bar fixed to the lower end of the beam, a brace arranged between the beam and the rear end of the bar, a plowshare detachably arranged on the lower end of the plow beam, a notched plate carried by the plowshare for engaging the lug on the plow beam, and a brace attached to the rear side of the plowshare and detachably secured to the brace between the plow beam and the horizontally disposed bar.

In testimony whereof, I have signed my name to this specification, in presence of two subscribing witnesses.

JOSEPH SCHIMANOSKI.

Witnesses:
M. P. SMITH,
E. L. WALLACE.